US010532387B2

(12) United States Patent
Tsukamoto et al.

(10) Patent No.: US 10,532,387 B2
(45) Date of Patent: Jan. 14, 2020

(54) PROGRESSIVE PROCESSING METHOD

(71) Applicant: TOSHIBA INDUSTRIAL PRODUCTS AND SYSTEMS CORP., Kawasaki-Shi, Kanagawa (JP)

(72) Inventors: Yoshihiro Tsukamoto, Mie (JP); Youichi Seo, Mie (JP); Toyonobu Yamada, Mie (JP); Chidai Isaka, Mie (JP)

(73) Assignee: TOSHIBA INDUSTRIAL PRODUCTS AND SYSTEMS CORP., Kawasaki-Shi (JP)

( * ) Notice: Subject to any disclaimer, the term of this patent is extended or adjusted under 35 U.S.C. 154(b) by 245 days.

(21) Appl. No.: 15/523,132

(22) PCT Filed: Aug. 5, 2015

(86) PCT No.: PCT/JP2015/072231
§ 371 (c)(1),
(2) Date: Apr. 28, 2017

(87) PCT Pub. No.: WO2016/067702
PCT Pub. Date: May 6, 2016

(65) Prior Publication Data

US 2017/0326607 A1 Nov. 16, 2017

(30) Foreign Application Priority Data

Oct. 29, 2014 (JP) ................................ 2014-220252

(51) Int. Cl.
*H02K 15/00* (2006.01)
*B21C 47/26* (2006.01)
(Continued)

(52) U.S. Cl.
CPC ............ *B21C 47/26* (2013.01); *B21C 47/247* (2013.01); *B21D 1/05* (2013.01); *B21D 43/02* (2013.01);
(Continued)

(58) Field of Classification Search
CPC . B32B 15/092; B32B 15/14; B32B 2305/188; B32B 27/38; B32B 5/024;
(Continued)

(56) References Cited

U.S. PATENT DOCUMENTS 3,533,891 A * 10/1970 Puyear .................. B21D 39/03 156/159
3,719,542 A * 3/1973 Schmitz ................ B21C 47/247 156/502
4,375,759 A 5/1983 Gentile

FOREIGN PATENT DOCUMENTS

CN 1437529 8/2003
CN 102459047 5/2012
(Continued)

OTHER PUBLICATIONS

Extended European Search Report issued in EP 158555968 dated May 24, 2018.

(Continued)

*Primary Examiner* — Thiem D Phan
(74) *Attorney, Agent, or Firm* — DLA Piper LLP US

(57) ABSTRACT

A method of progressive processing includes feeding a strip-shaped sheet to a press machine; pressing the strip-shaped sheet with the press machine; and joining the strip-shaped sheet with a new strip-shaped sheet by applying a tape over an end of the strip-shaped sheet located in a direction opposite a direction in which the strip-shaped sheet is fed and an end of the new strip-shaped sheet located in a direction in which the new strip-shaped sheet is fed.

6 Claims, 7 Drawing Sheets

8 3 41 8 3 11
11
X

(51) Int. Cl.

| | |
|---|---|
| ***B21D 43/02*** | (2006.01) |
| ***B21D 1/05*** | (2006.01) |
| ***B21C 47/24*** | (2006.01) |
| ***H02K 15/02*** | (2006.01) |

(52) U.S. Cl.
CPC .............. *H02K 15/02* (2013.01); *Y02P 80/30* (2015.11); *Y10T 29/49009* (2015.01)

(58) Field of Classification Search
CPC ..... B32B 9/047; C09J 163/00; C09J 2463/00; C09J 5/00; Y10T 29/49009; Y10T 29/49012; Y10T 156/1066; B29C 65/5042; B29C 65/7802; A63B 2209/02
USPC ......... 29/596, 428, 522.1, 524, 525, 525.13, 29/598
See application file for complete search history.

(56) References Cited

FOREIGN PATENT DOCUMENTS

| | | |
|---|---|---|
| CN | 102471859 | 5/2012 |
| DE | 33 11 394 | 10/1984 |
| JP | S54-25578 | 2/1979 |
| JP | S55-74940 | 6/1980 |
| JP | S57-64428 | 4/1982 |
| JP | S58-12558 | 1/1983 |
| JP | S58-068437 | 4/1983 |
| JP | S59-24526 | 2/1984 |
| JP | S61-155484 | 7/1986 |
| JP | H03-52729 | 3/1991 |
| JP | H04-118124 | 4/1992 |
| JP | H05-315497 | 11/1993 |
| JP | H08-39261 | 2/1996 |
| JP | H11-300418 | 11/1999 |
| JP | H11-347792 | 12/1999 |
| JP | 2014-104500 | 6/2014 |

OTHER PUBLICATIONS

Chinese Office Action issued in CN 201580058928 dated Jun. 22, 2018.
International Search Report (with English Translation) issued in PCT/JP2015/072231 dated Oct. 27, 2015.
Written Opinion (with English Translation) issued in PCT/JP2015/072231 dated Oct. 27, 2015.
English Language Abstract and Translation of JP H11-300418 published Nov. 2, 1999.
English Language Abstract and Translation of JP S54-25578 published Feb. 26, 1979.
English Language Abstract and Translation of JP S57-64428 published Apr. 19, 1982.
English Language Abstract and Translation of JP S55-74940 published Jun. 5, 1980.
English Language Abstract and Translation of JP S59-24526 published Feb. 8, 1984.
English Language Abstract and Translation of JP H08-39261 published Feb. 13, 1996.
English Language Abstract and Translation of JP H11-347792 published Dec. 21, 1999.
English Language Abstract and Translation of JP H03-52729 published Mar. 6, 1991.
English Language Abstract and Translation of JP H04-118124 published Apr. 20, 1992.
English Language Abstract and Translation of JP 2014-104500 published Jun. 9, 2014.
English Language Abstract and Translation of JP S61-155484 published Jul. 15, 1986.
European Office Action issued in EP Application No. 15 855 568.0-1016 dated Sep. 6, 2019.

* cited by examiner

PROGRESSIVE PROCESSING METHOD

CROSS-REFERENCE TO RELATED APPLICATION(S)

This application is a National Stage Application of International Application No. PCT/JP2015/072231, filed on Aug. 5, 2015 which is based upon and claims the benefit of priority from Japanese Patent Application No. 2014-220252, filed on, Oct. 29, 2014. The entirety of all the above-listed applications are incorporated herein by reference.

FIELD

Embodiments disclosed herein relate to a progressive processing method.

BACKGROUND

Some progressive processing methods are provided with a feeding step and a pressing step. The feeding step carries strip-shaped sheets to a press machine and the pressing step presses the strip-shaped sheet.

Japanese Patent Publication No. H11-300418 discloses welding an end of a strip-shaped sheet located in the direction opposite the direction in which the strip-shaped sheet is fed with an end of a new strip-shape located in the direction in which the new strip-shaped sheet is fed and feeding the new strip-shaped sheet to the press machine subsequent to the strip-shaped sheet. The above described welding is suited for processing thick strip-shaped sheets. Thus, application of the above described welding to thin strip-shaped sheets results in reduced tensile strength, straining, etc. to exhibit unstable welding quality and therefore is problematic in terms of ensuring strength of the strip-shaped sheets being fed.

DESCRIPTION

An embodiment of a progressive processing method includes feeding a strip-shaped sheet to a press machine; pressing the strip-shaped sheet with the press machine; and joining the strip-shaped sheet with a new strip-shaped sheet by applying a tape over an end of the strip-shaped sheet located in a direction opposite a direction in which the strip-shaped sheet is fed and an end of the new strip-shaped sheet located in a direction in which the new strip-shaped sheet is fed, wherein, after the joining, the new strip-shaped sheet is fed to the press machine subsequent to the strip-shaped sheet by performing the feeding, and the new strip-shaped sheet is pressed subsequent to the strip-shaped sheet by performing the pressing.

First Embodiment

Figure 1:
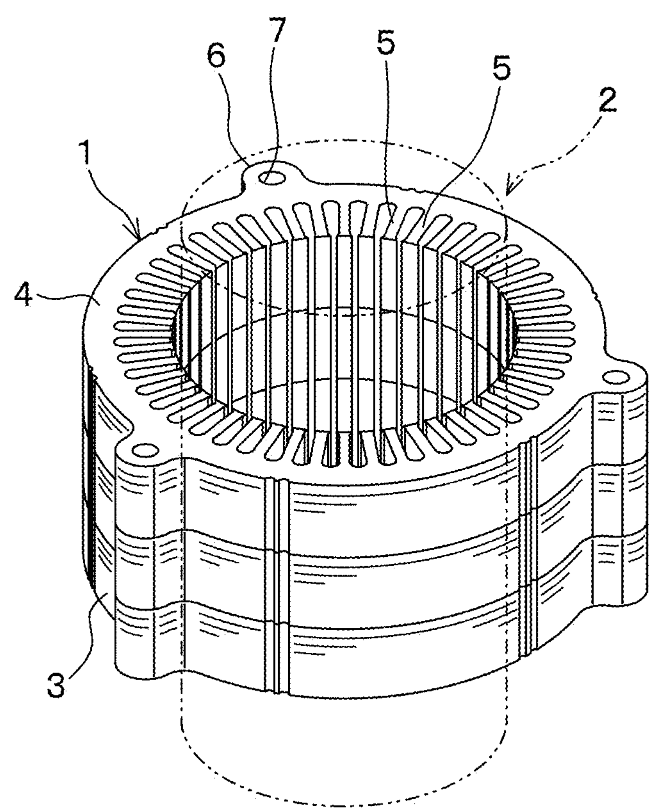
FIG. 1 is a figure illustrating a first embodiment (exterior look of a stator core and a rotor core).

A stator core 1 and a rotor core 2 of FIG. 1 constitute a three-phase synchronous motor of an inner-rotor type. The stator core 1 is formed by axially stacking multiple stator blanks 3 and is provided with a yoke 4, multiple teeth 5, and multiple connection pieces 6. The yoke 4 is formed into a cylinder and each of the teeth 5 protrudes inward from the inner peripheral surface of the yoke 4 and each of the connection pieces 6 protrudes outward from the outer peripheral surface of the yoke. Each of the connection pieces 6 is provided with a connection hole 7 and the stator blanks 3 are connected by press fitting a connection tube in each of the connection holes 7.

As shown in FIG. 1, the rotor core 2 is placed inside the stator core 1. The rotor core 2 is formed by axially stacking multiple rotor blanks 8 (see FIG. 3). The count of stacked rotor blanks 8 is specified to be greater than the count of stacked stator blanks 3. The axial length of the rotor core 2 is specified to be greater than that of the stator core 1. A rotary shaft and multiple permanent magnets are mounted to the rotor core 2.

Figure 2:
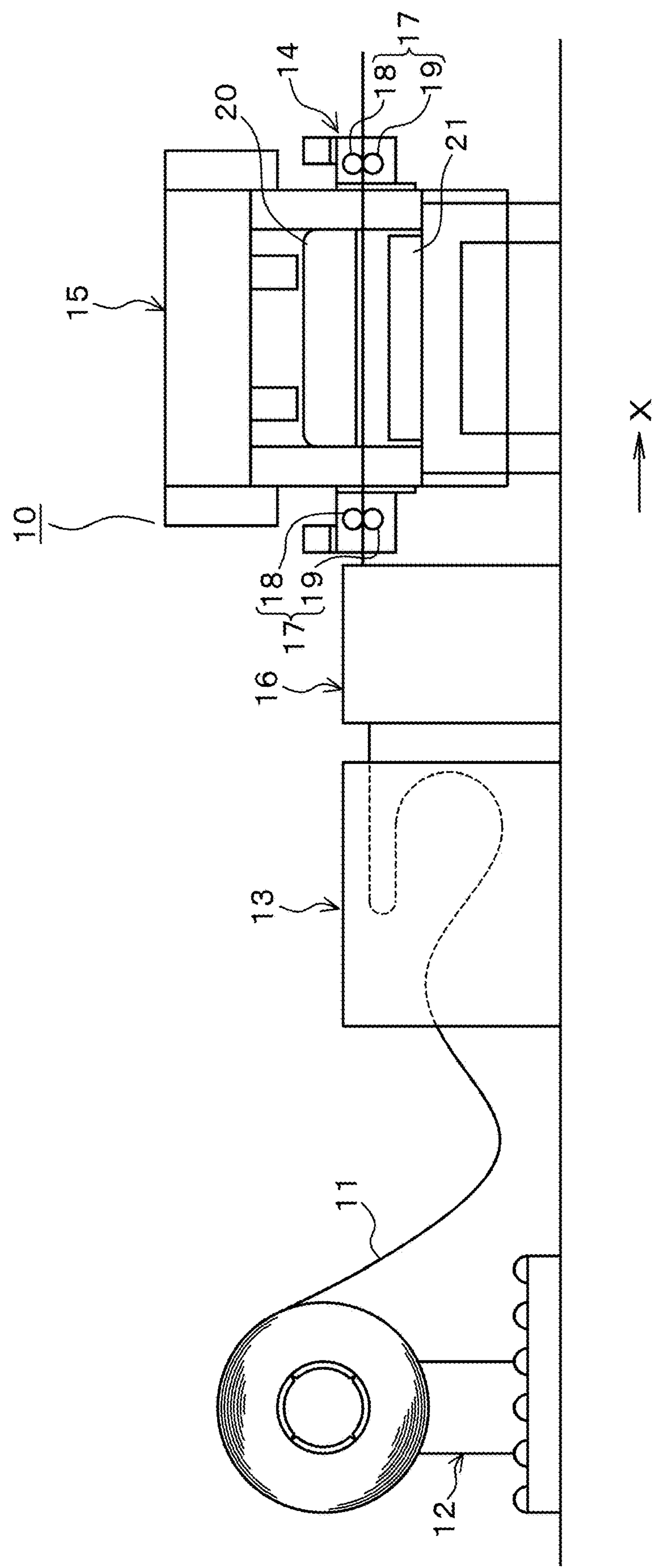
FIG. 2 is a figure illustrating a progressive processing apparatus.

A progressive processing apparatus 10 of FIG. 2 is configured to punch out stator blanks 3 and rotor blanks 8 from a strip-shaped steel sheet 11 and is provided with an uncoiler 12, a leveler 13, a feeder 14, a press machine 15, and a joining apparatus 16. The uncoiler 12 has the strip-shaped steel sheet 11 detachably attached thereto. The strip-shaped steel sheet 11 is wound into a coil and the uncoiler 12 unwinds the coiled strip-shaped steel sheet 11. The strip-shaped steel sheet 11 is formed of a silicon steel sheet having a thickness of 0.35 mm or less and the stator blanks 3 as well as the rotor blanks 8 are punched out in two rows namely row P and row Q aligned in the shorter side direction of the silicon steel sheet 11. The strip steel sheet 11 corresponds to the strip-shaped sheet.

As shown in FIG. 2, the leveler 13 is disposed in the direction indicated by arrow X from the uncoiler 12 and is provided with multiple sets of leveler rollers. Each of the multiple sets of leveler rollers comprises a couple of rollers facing one another and the strip-shaped steel sheet 11 is inserted between the couple of rollers of each of the multiple sets of leveler rollers. Each of the multiple sets of leveler rollers is configured to plastically deform the strip-shaped steel sheet 11 by applying external force to the strip-shaped steel sheet 11 and the strip-shaped steel sheet 11 is uncurled as it passes between the multiple sets of leveler rollers.

As shown in FIG. 2, the feeder 14 is provided with two sets of feed rolls 17 and one of the feed rolls 17 is provided on one end of the press machine 15 located in the direction indicated by arrow X and the other of the feed rolls 17 is provided on the other end of the press machine 15 located in the direction opposite the direction indicated by arrow X. Each of the two sets of feed rolls 17 is provided with an upper roller 18 and a lower roller 19 and the strip-shaped steel sheet 11 is passed between the upper roller 18 and the lower roller 19 of one of the feed rolls 17 and thereafter inserted between the upper roller 18 and the lower roller 19 of the other of the feed rolls 17. The couple of upper rollers 18 and the couple of lower rollers 19 are connected to an electrical drive source. The drive source rotates each of the couple of upper rollers 18 in the counterclockwise direction as viewed in FIG. 2 and rotates each of the couple of lower rollers 19 in the clockwise direction as viewed in FIG. 2. The strip-shaped steel sheet 11 is fed in the arrow X direction by the rotation of the couple of upper rollers 18 and the couple of lower rollers 19.

As illustrated in FIG. 2, the press machine 15 is disposed in the arrow X direction from the leveler 13 and an uncurled strip-shaped steel sheet 11 is fed from the leveler 13 to the press machine 15. The press machine 15 comprises a mechanical press configured to convert a rotary motion of the press motor into a linear reciprocating motion and is provided with an upper die 20 and a lower die 21. The lower die 21 supports dies D1, D2, D3, D4, D5, and D6 (neither shown). The dies D1 to D6 are aligned in one row in the arrow X direction in the order of die D1→D2→D3→D4→D5→D6 and are spaced from one another by pitch P.

The upper die 20 supports punches P1, P2, P3, P4, P5, and P6 (neither shown). Punches P1 to P6 are aligned in one row in the arrow X direction in the order of P1→P2→P3→P4→P5→P6 and punch P1 faces down on die D1, P2 faces down on die D2, P3 faces down on die D3, P4 faces down on die D4, P5 faces down on die D5, and P6 faces down on die D6.

The feeder 14 is configured to feed the strip-shaped steel sheet 11 intermittently in the arrow X direction. The feed pitch of the strip-shaped steel sheet 11 is specified to pitch P which is identical to the alignment pitch of the dies D1 to D6. The strip-shaped steel sheet 11 is fed by pitch P in the arrow X direction so as to be sequentially supplied "between punch P1 and die D1"→"between punch P2 and die D2"→"between punch P3 and die D3"→"between punch P4 and die D4"→"between punch P5 and die D5"→"between punch P6 and die D6". The dies D1 to D6 and punches P1 to P6 apply shearing process on the strip-shaped steel sheet 11 and the feeder 14 stops feeding of the strip-shaped steel sheet 11 at the timing when shearing process is applied to the strip-shaped steel sheet 11.

Figure 3:
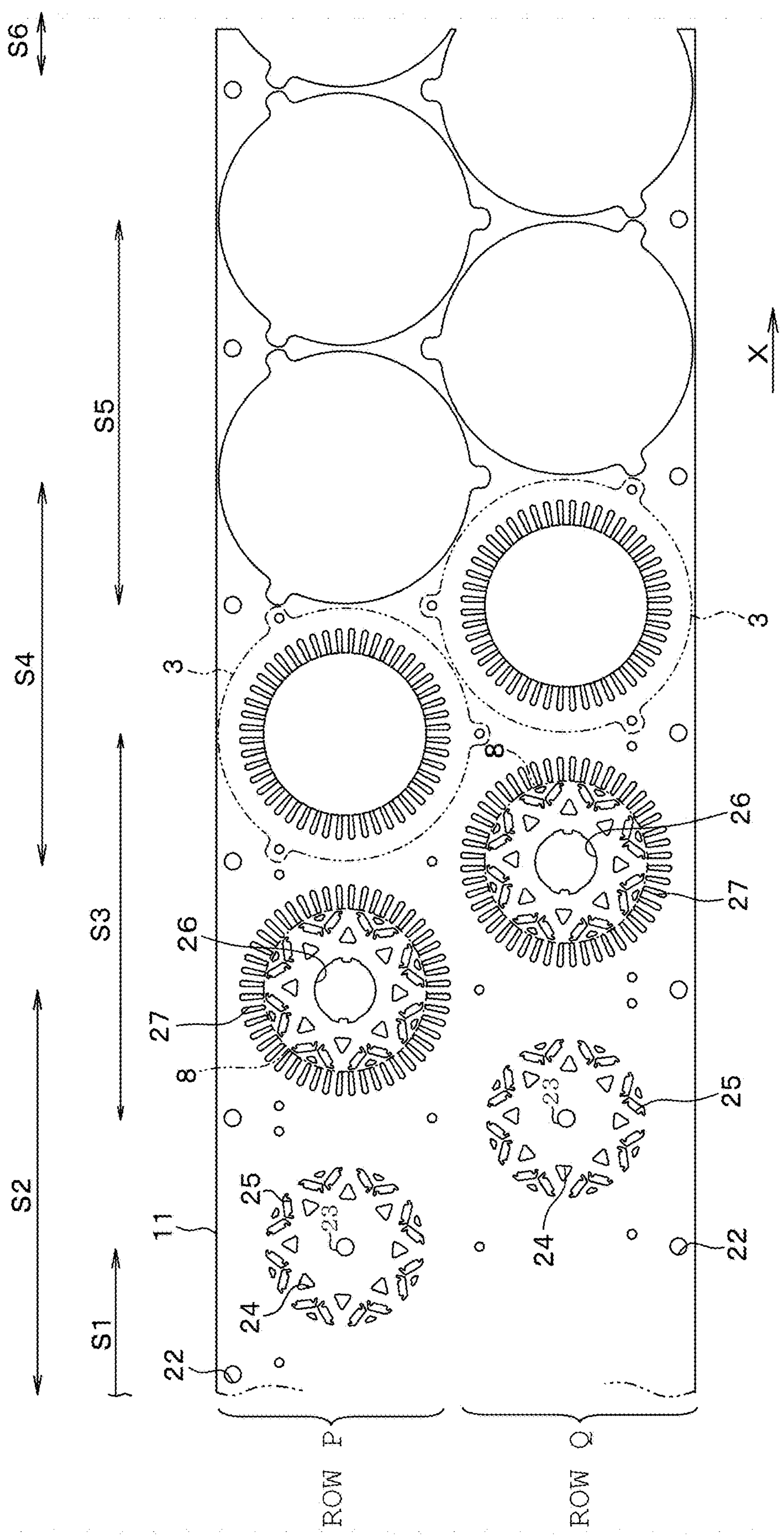
FIG. 3 is a figure illustrating a strip-shaped sheet.

The die D1 and the punch P1 constitute a processing stage S1 and as shown in FIG. 3, pilot holes 22 for positioning purposes are formed by shearing process on each of the row P and the row Q of the strip-shaped steel sheet 11 at the processing stage S1. The die D2 and the punch P2 constitute a processing stage S2 and at the processing stage S2, holes 23, 24, and 25 are formed by shearing process on each of the row P and the row Q of the strip-shaped steel sheet 11. The holes 23 to 25 are formed for the rotor blank 8 and are shaped differently from one another.

The die D3 and the punch P3 constitute a processing stage S3 and as shown in FIG. 3, holes 26 and 27 are formed by shearing process on each of the row P and the row Q of the strip-shaped steel sheet 11 at the processing stage S3. The holes 26 are formed for the rotor blank 8 through which the rotary shaft is inserted and holes 27 correspond to slots for the stator blank 3.

The die D4 and the punch P4 constitute a processing stage S4 and as shown in FIG. 3, the rotor blank 8 is punched out from each of the row P and the row Q of the strip-shaped steel sheet 11 at the processing stage S4. The rotor blank 8 falls into the die D4 and the rotor blanks 8 are stacked upward one after another in the die D4 as the punching of the rotor blanks 8 is repeated.

The die D5 and the punch P5 constitute a processing stage S5 and as shown in FIG. 3, the stator blank 3 is punched out from each of the row P and the row Q of the strip-shaped steel sheet 11 at the processing stage S5. The stator blank 3 falls into the die D5 and the stator blanks 3 are stacked upward one after another in the die D5 as the punching of the stator blanks 3 is repeated.

The die D6 and the punch P6 constitute a processing stage S6 and as shown in FIG. 3, remaining parts are cut from the row P and the row Q of the strip-shaped steel sheet 11 at processing stage S6. In summary, the stator blanks 3 and the rotor blanks 8 are punched out from the strip-shaped steel sheet 11 in two rows aligned in the shorter side direction of strip-shaped steel sheet 11 as the strip-shaped steel sheet 11 is sequentially supplied "between punch P1 and die D1" to "between punch P6 and die D6".

As illustrated in FIG. 2, the joining apparatus 16 is disposed between the leveler 13 and the pressing machine 15 and the strip-shaped steel sheet 11 is supplied to the press machine 15 from the leveler 13 via the joining apparatus 16. The joining apparatus 16 is configured to join a new strip-shaped steel sheet 11 to the remaining strip-shaped steel sheet 11. The remaining strip-shaped steel sheet 11 is the strip-shaped steel sheet 11 located in the press machine 15 side, from which the stator blanks 3 and the rotor blanks 8 have been punched out. The new strip-shaped steel sheet 11 is the strip-shaped steel sheet 11 which has been attached to the uncoiler 12 subsequent to the remaining strip-shaped steel sheet 11. The new strip-shaped steel sheet 11 is yet to be processed by the press machine 15 and one end of the new strip-shaped steel sheet 11 located in the arrow X direction is joined with one end of the remaining strip-shaped steel sheet 11 located in the direction opposite of the arrow X direction by the joining apparatus 16.

FIG. 4 illustrates the joining apparatus 16 and the joining apparatus 16 is provided with an upper front clamp 31, a lower front clamp 32, upper rear clamp 33, lower rear clamp 34, an upper blade 35, a lower blade 36, and a joining base 37. The upper front clamp 31 and the lower front clamp 32 are each configured to be movable in the up and down direction. The upper front clamp 31 and the lower front clamp 32 are connected to a front clamp motor and the front clamp motor moves each of the upper front clamp 31 and the lower front clamp 32 in the up and down direction.

The upper rear clamp 33 and the lower rear clamp 34 are configured to be movable in the up and down direction and the left and right direction. The upper rear clamp 33 and the lower rear clamp 34 are connected to a rear clamp motor and the rear clamp motor is configured to move each of the upper rear clamp 33 and the lower rear clamp 34 in the up and down direction. The upper rear clamp 33 and the lower rear clamp 34 are connected to a clamp transfer motor and the clamp transfer motor is configured to move each of the upper rear clamp 33 and the lower rear clamp 34 in the left and right direction.

The upper blade 35 and the lower blade 36 are configured to be movable in the up and down direction as well as the left and right direction. The upper blade 35 and the lower blade 36 are connected to a cut motor and the cut motor is configured to move each of the upper blade 35 and the lower blade 36 in the up and down direction. The upper blade 35 and the lower blade 36 are connected to a blade transfer motor and the blade transfer motor is configured to move each of the upper blade 35 and the lower blade 36 in the left and right direction. The joining base 37 is configured to be movable in the up and down direction and the left and right direction. The joining base 37 is connected to a lifting/lowering motor and the lifting/lowering motor is configured to move the joining base 37 in the up and down direction. The joining base 37 is connected to a base transfer motor and the base transfer motor is configured to move the joining base 37 in the left and right direction.

The front clamp motor, the rear clamp motor, the clamp transfer motor, the cut motor, the blade transfer motor, the lifting/lowering motor, and the base transfer motor are connected to a control circuit. The control circuit is configured to electrically control the drive of each of the front clamp motor to the base transfer motor listed above according to a predetermined drive pattern. The upper front clamp 31 to the joining base 37 listed above operate as set forth in the following [1] to [10] in response to the front clamp motor to the base transfer motor being driven according to the drive pattern.

Figure 4A:
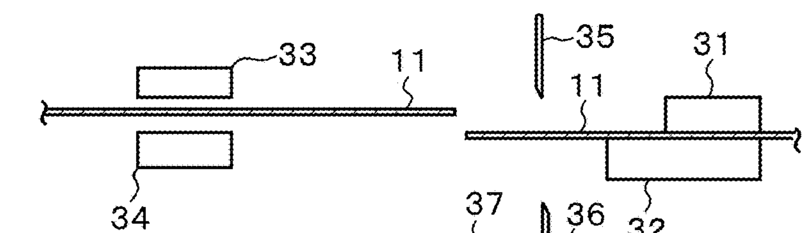
FIGS. 4A-4F are figures for explaining the operation of a joining apparatus.

[1] The upper front clamp 31 and the lower front clamp 32 are moved in the up and down direction to clamp the end of the remaining strip-shaped steel sheet 11 unmovably (see FIG. 4A). When the remaining strip-shaped steel sheet 11 is in a clamped state, the upper rear clamp 33 and the lower rear clamp 34 are separated in the up and down direction from the end of the new strip-shaped steel sheet 11 to place the new strip-shaped steel sheet 11 in an unclamped state. The end of the new strip-shaped steel sheet 11 is to be manually inserted between the upper rear clamp 33 and the lower rear clamp 34 by the worker.

Figure 4B:
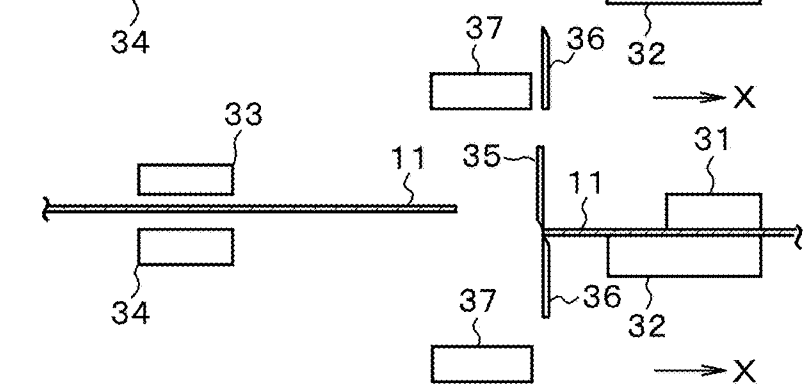
Figure 5A:
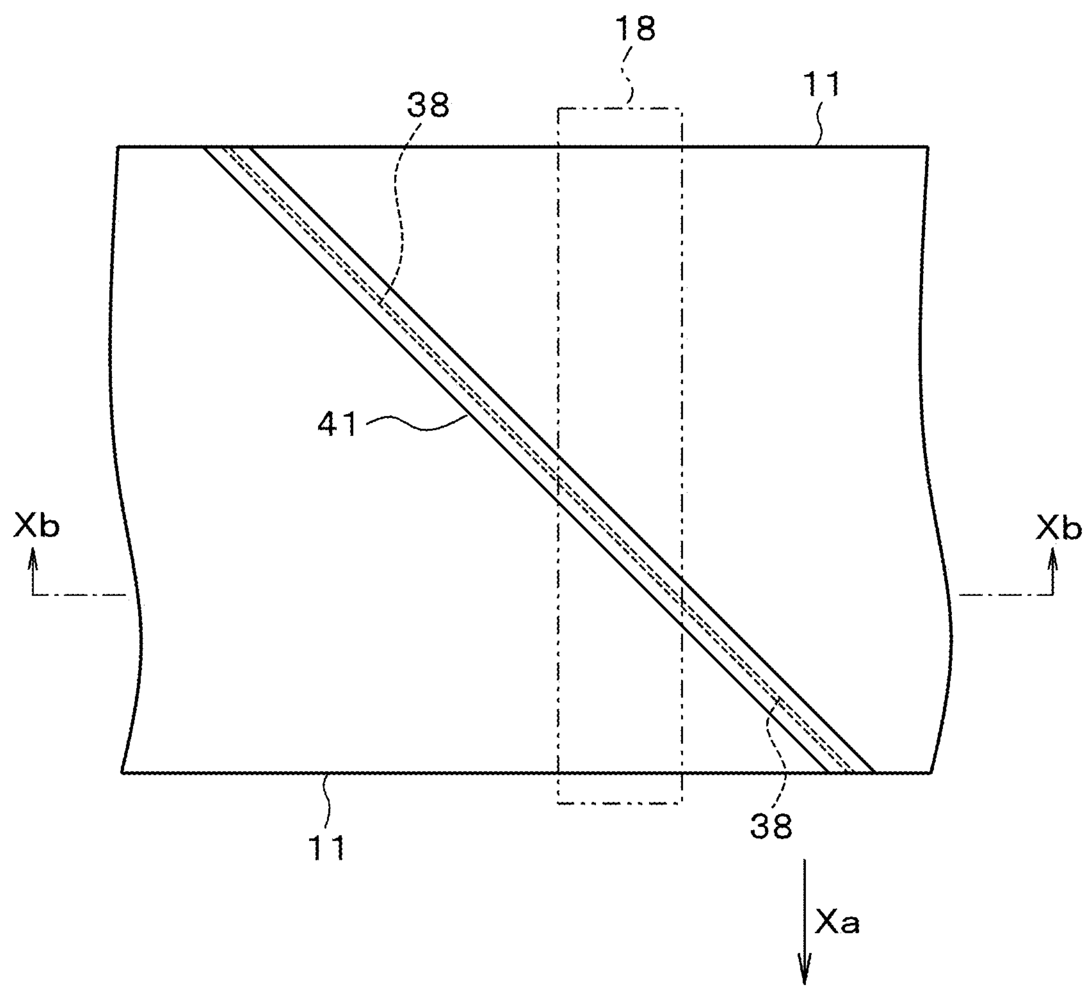
FIGS. 5A-5B are figures illustrating how the strip-shaped sheet is fed.

[2] The end of the remaining strip-shaped steel sheet 11 is cut off by the up and down movement of the upper blade 35 and the lower blade 36 with the remaining strip-shaped steel sheet 11 in the clamped state (See FIG. 4B). The upper blade 35 and the lower blade 36 are angled by 45° in top view with respect to direction X in which the strip-shaped steel sheet 11 is fed and by cutting off the end of the remaining strip-shaped steel sheet 11 at an angle as shown in FIG. 5A, a sloped cut surface 38 inclined by 45° with respect to direction X in which the strip-shaped steel sheet 11 is fed is formed. The cut surface 38 of the remaining strip-shaped steel sheet 11 corresponds to a first cut surface.

Figure 4C:
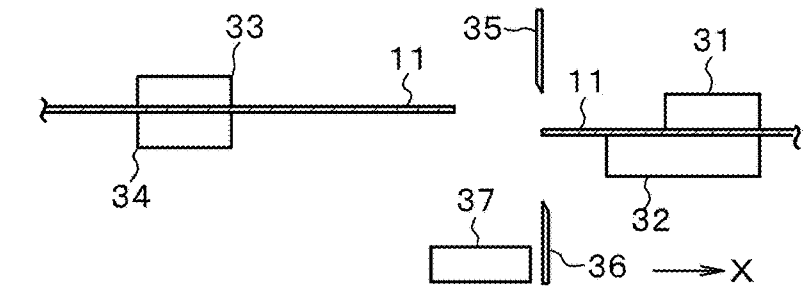
Figure 4D:
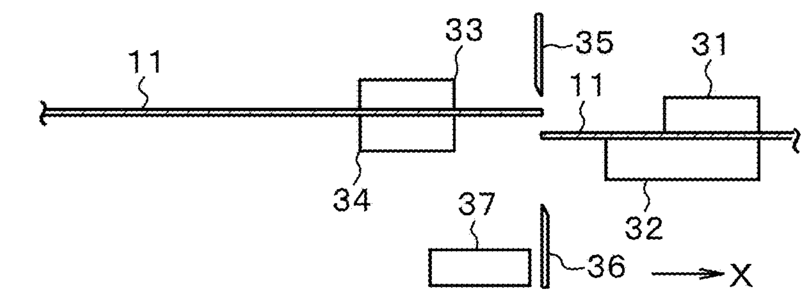

[3] The upper rear clamp 33 and the lower rear clamp 34 are moved in the up and down direction to unmovably clamp the end of the new strip-shaped steel sheet 11 (See FIG. 4C).

[4] The end of the new strip-shaped steel sheet 11 is fed between the upper blade 35 and the lower blade 36 by moving the new strip-shaped steel sheet 11 being clamped by the upper rear clamp 33 and lower rear clamp 34 in the left and right direction.

[5] The end of the new strip-shaped steel sheet 11 is cut off by the up and down movement of the upper blade 35 and the lower blade 36 with the new strip-shaped steel sheet 11 in the clamped state (See FIG. 4D) and a sloped cut surface 38 (See FIG. 5A) inclined by 45° with respect to direction X in which the new strip-shaped steel sheet 11 is fed is formed. The cut surface 38 of the new strip-shaped steel sheet 11 corresponds to a second cut surface.

Figure 4E:
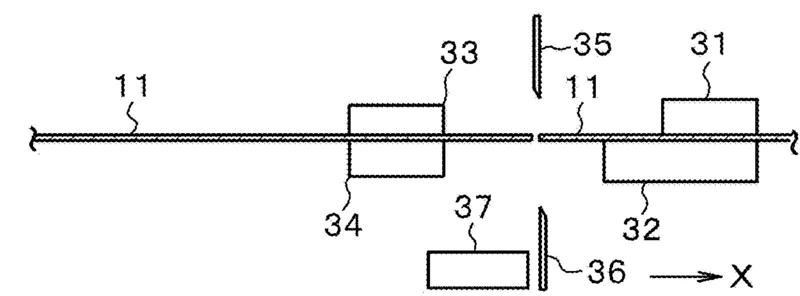
Figure 6:
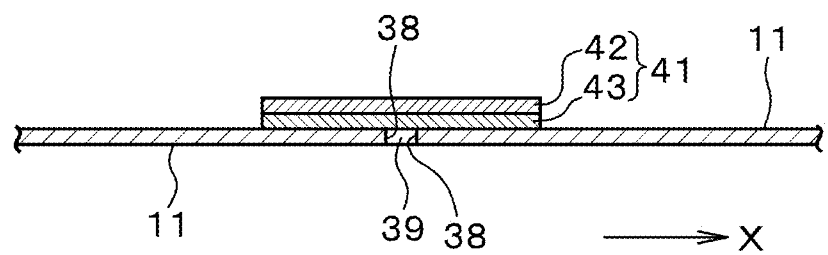
FIG. 6 is a cross-sectional view illustrating the strip-shaped sheets being joined.

[6] The upper rear clamp 33 and the lower rear clamp 34 are moved in the up and down direction and the left and right direction (See FIG. 4E). The upper rear clamp 33 and the lower rear clamp 34 are moved with the new strip-shaped steel sheet 11 in the clamped state and as the result of the movement of upper rear clamp 33 and the lower rear clamp 34, the cut surface 38 of the new strip-shaped steel sheet 11 is disposed at the same height as the cut surface 38 of the remaining strip-shaped steel sheet 11. The cut surface 38 of the new strip-shaped steel sheet 11 is parallel with the cut surface 38 of the remaining strip-shaped steel sheet 11 and a clearance 39 shown in FIG. 6 is defined between the two cut surfaces 38.

Figure 4F:
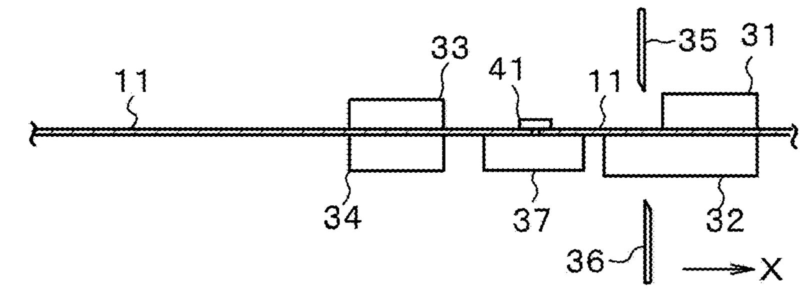

[7] The upper blade 35 and the lower blade 36 are moved in the left and right direction (See FIG. 4F). As the result of the movement of the upper blade 35, a working space allowing insertion of the worker's hand is defined above the two cut surfaces 38 namely, the cut surface 38 of the remaining strip-shaped steel sheet 11 and the cut surface 38 of the new strip-shaped steel sheet 11. As the result of the movement of the lower blade 36, an intrusion space allowing intrusion of the joining base 37 is defined below the two cut surfaces 38 namely, the cut surface 38 of the remaining strip-shaped steel sheet 11 and the cut surface 38 of the new strip-shaped steel sheet 11.

[8] The movement of the joining base 37 in the up and down direction and the left and right direction causes intrusion of the joining base 37 into the intrusion space from below to contact the under surface of the remaining strip-shaped steel sheet 11 and the under surface of the new strip-shaped steel sheet 11 from below (See FIG. 4F).

[9] The worker inserts his/her hand into the work space from above and applies an adhesive tape 41 on the upper surface of the remaining strip-shaped steel sheet 11 and the upper surface of the new strip-shaped steel sheet 11 (See FIG. 4F). The adhesive tape 41 is applied obliquely along the cut surface 38 of the remaining strip-shaped steel sheet 11 and the cut surface 38 of the new strip-shaped steel sheet 11 and the remaining strip-shaped steel sheet 11 and the new strip-shaped steel sheet 11 are joined by the adhesive tape 41 as shown in FIG. 5A. As shown in FIG. 6, the adhesive tape 41 comprises a polyester film 42 having an acrylic transparent adhesive 43 coated thereon and is non-magnetic. The lateral width of the adhesive tape 41 is specified to 10 mm. The film 42 of the adhesive tape 41 is colored and is nontransparent. The color of the film 42 is specified to be different from the remaining strip-shaped steel sheet 11 and the new strip-shaped steel sheet 11. The adhesive tape corresponds to the tape.

[10] The upper front clamp 31 and the lower front clamp 32 are moved in the up and down direction to unclamp the remaining strip-shaped steel sheet 11 and the joining base 37 is moved in the up and down direction and the left and right direction to revert to its initial position. The upper rear clamp 33 and the lower rear clamp 34 are moved in the up and down direction to unclamp the new strip-shaped steel sheet 11 and the rear upper clamp 33 and the rear lower clamp 34 are moved in the left and right direction to revert to their initial positions. Thus, the operation of the feeder 14 causes the remaining strip-shaped steel sheet 11 and the new strip-shaped steel sheet 11 to be fed integrally in the arrow X direction. As a result, the new strip-shaped steel sheet 11 is sequentially fed through processing stages S1 to S6 of the pressing machine 15 subsequent to the remaining strip-shaped steel sheet 11 without requiring the worker to set the strip-shaped steel sheet 11 to the feeder 14, etc. and shearing process is applied to the new strip-shaped steel sheet 11 in the processing stages S1 to S6 subsequent to the remaining strip-shaped steel sheet 11.

The first embodiment provides the following effects.

The new strip-shaped steel sheet 11 is joined with the remaining strip-shaped steel sheet 11 by applying the adhesive tape 41 over one end of the remaining strip-shaped steel sheet 11 located in the direction opposite the direction indicated by arrow X and one end of the new strip-shaped steel sheet 11 located in the direction indicated by arrow X. Thus, the new strip-shaped steel sheet 11 is supplied to the pressing machine 15 subsequent to the remaining strip-shaped steel sheet 11 by feeding the remaining strip-shaped steel sheet 11 in the arrow X direction by the feeder 14, thereby causing pressing process to be applied to the new strip-shaped steel sheet 11 subsequent to the remaining strip-shaped steel sheet 11. It is thus, possible to reduce wasted material and to also reduce setup time. It is further possible to eliminate reduced tensile strength and straining, etc. which were some of the problems encountered in welding thin strip-shaped sheets 11. As a result, it is possible to improve the strength of the strip-shaped sheets 11 being fed and allow the strip-shaped sheets 11 to be transferred smoothly.

A non-magnetic adhesive tape 41 is used as the tape for joining the remaining strip-shaped steel sheet 11 and the new strip-shaped steel sheet 11. Thus, unlike the case in which an aluminum tape is used, punch waste made of magnetic materials will not attach to the stator blanks 3 and rotor blanks 8. As a result, the quality of the stator core 1 will stabilize when the stator core 1 is manufactured by stacking the stator blanks 3 and the quality of the rotor core 2 will stabilize when the rotor core 2 is manufactured by stacking the rotor blanks 8.

The adhesive tape 41 which is colored differently from the strip-shaped steel sheet 11 is used as the tape for joining the remaining strip-shaped steel sheet 11 and the new strip-shaped steel sheet 11. It is thus, possible to visually check whether the adhesive tape 41 is precisely applied to the targeted location more easily.

Figure 5B:
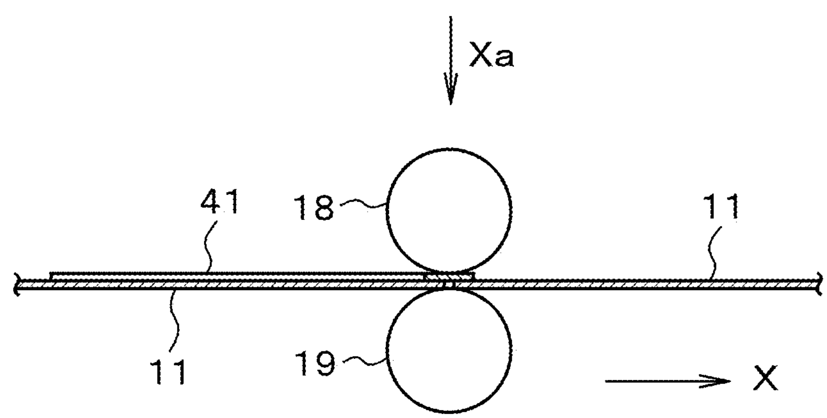

An inclined cut surface 38 is formed on each of the remaining strip-shaped steel sheet 11 and the new strip-shaped steel sheet 11 by cutting the end of each of the remaining strip-shaped steel sheet 11 and the new strip-shaped steel sheet 11 by the upper blade 35 and the lower blade 36 and the adhesive tape 41 is applied over the remaining strip-shaped steel sheet 11 and the new strip-shaped steel sheet 11 so as to be oriented along the two cut surfaces 38. Because the adhesion surfaces of the adhesive tape 41 with respect to each of the remaining strip-shaped steel sheet 11 and the new strip-shaped steel sheet 11 are increased, the remaining strip-shaped steel sheet 11 and the new strip-shaped steel sheet 11 are joined more strongly. Further, the adhesive tape 41 will gradually pass between the upper rollers 18 and the lower rollers 19 (See FIG. 5). It is thus, possible to disperse the force applied to the adhesive tape 41 from the upper rollers 18 and the lower rollers 19 and thereby prevent the peeling of the adhesive tape 41 when passing between the upper rollers 18 and the lower rollers 19.

The adhesive tape 41 is arranged to be applied over the upper surface of the remaining strip-shaped steel sheet 11 and the upper surface of the new strip-shaped steel sheet 11. It is thus, possible to facilitate the worker's task of reaching his/her hand into the working space from above to apply the adhesive tape 41.

The remaining strip-shaped steel sheet 11 and the new strip-shaped steel sheet 11 are joined by the adhesive tape 41 after the new strip-shaped steel sheet 11 is uncurled by the leveler 13. Therefore, the adhesive tape 41 will not pass between the leveler rollers of the leveler and thus, the adhesive tape 41 will not peel by the force applied when passing between the leveler rollers.

The clearance 39 is defined between the two cut surfaces 38 when joining the remaining strip-shaped steel sheet 11 and the new strip-shaped steel sheet 11 with the adhesive tape 41. Thus, unlike the case in which the two cut surfaces 38 are placed in contact with one another, the remaining strip-shaped steel sheet 11 and the new strip-shaped steel sheet 11 will not be joined in the shape of a dogleg. Thus, the remaining strip-shaped steel sheet 11 and the new strip-shaped steel sheet 11 are fed smoothly to the press machine 15.

Second Embodiment

Figure 7:
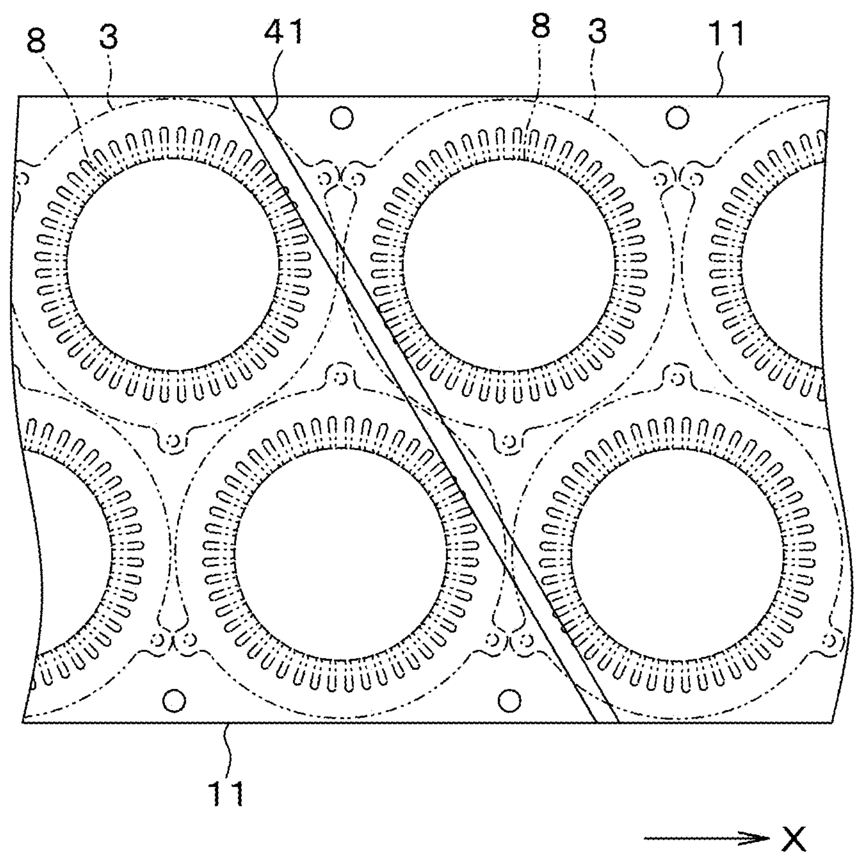
FIG. 7 is a figure illustrating a second embodiment (a figure for explaining where an adhesive tape is applied)

FIG. 7 shows how the joining portions of the remaining strip-shaped steel sheet 11 and the new strip-shaped steel sheet 11 are processed by the press machine 15. The adhesive tape 41 is punched out with the stator blanks 3 in the processing stage S5 and falls into the die D5 of the lower die 21. The stator blank 3 having the adhesive tape 41 attached thereto is not used in the product and is disposed of. In other words, the adhesive tape 41 is applied to portions of the remaining strip-shaped steel sheet 11 and the new strip-shaped steel sheet 11 which are punched out as the stator blanks 3, that is, portions which are not punched out as rotor blanks 8.

The above described second embodiment provides the following effects.

The adhesive tape 41 is applied to the end of the remaining strip-shaped steel sheet 11 located in the direction opposite the arrow X direction and the end of the new strip-shaped steel sheet 11 located in the arrow X direction so as to avoid portions in which the rotary blanks 8 are punched out. It is thus, possible to punch out increasing number of rotor blanks 8 from the remaining strip-shaped steel sheet 11 and the new strip-shaped steel sheet 11. As a result, it is possible to secure required number of stator blanks 3 and required number of rotor blanks 8 in a less number of strip-shaped sheets 11 regardless of the fact that greater number of rotor blanks 8 are stacked compared to the number of stator blanks 3 being stacked.

Third Embodiment

Figure 8:
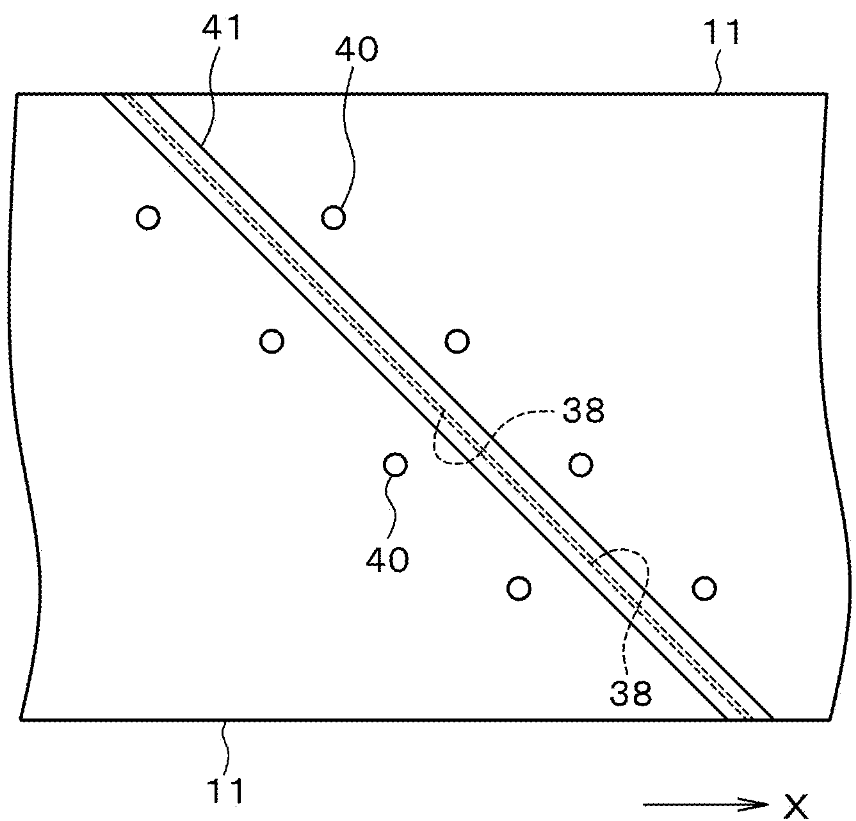
FIG. 8 is a figure illustrating a third embodiment (a figure illustrating positioning holes of the strip-shaped sheet).

As illustrated in FIG. 8, multiple positioning holes 40 are formed on each of the remaining strip-shaped steel sheet 11 and the new strip-shaped steel sheet 11. The positioning holes 40 of the remaining strip-shaped steel sheet 11 are aligned in a row oriented along the cut surface 38 of the remaining strip-shaped steel sheet 11. The positioning holes 40 of the new strip-shaped steel sheet 11 are aligned in a row extending along the cut surface 38 of the new strip-shaped steel sheet 11. Positioning pins are inserted into each of the positioning holes 40 of the remaining strip-shaped steel sheet 11 and the positioning holes 40 of the new strip-shaped steel sheet 11.

The positioning pins are fixed to the joining base 37 and are inserted into the positioning holes 40 when the joining base 37 enters the intrusion space. The positioning pins are configured to constrain each of the remaining strip-shaped steel sheet 11 and the new strip-shaped steel sheet 11 unmovably at their targeted positions and prevents the displacement of the remaining strip-shaped steel sheet 11 and the new strip-shaped steel sheet 11 when the worker applies the adhesive tape 41 on the upper surface of the remaining strip-shaped steel sheet 11 and the upper surface of the new strip-shaped steel sheet 11. Each of the positioning pins is removed from the positioning holes 40 of the remaining strip-shaped steel sheet 11 and the positioning holes 40 of the new strip-shaped sheets 11 when the joining base 37 is moved to its initial position.

In the first, the second, and the third embodiment, an aluminum tape may be used instead of the non-magnetic adhesive tape 41.

In the first, the second, and the third embodiment, the adhesive tape 41 may be applied automatically to the remaining strip-shaped steel sheet 11 and the new strip-shaped steel sheet 11 by a robot, or the like.

In the first, the second, and the third embodiment, the stator blanks 3 and the rotor blanks 8 may be punched out from the strip-shaped steel sheet 11 in one row or three or more rows taken along the shorter side of the strip-shaped steel sheet 11.

In the first, the second, and the third embodiment, products other than the stator blanks 3 and the rotor blanks 8 may be punched out from the strip-shaped steel sheet 11.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of progressive processing comprising:
- feeding a strip-shaped sheet to a press machine;
- pressing the strip-shaped sheet with the press machine; and
- joining the strip-shaped sheet with a new strip-shaped sheet by applying a tape over an end of the strip-shaped sheet located in a direction opposite a direction in which the strip-shaped sheet is fed and an end of the new strip-shaped sheet located in a direction in which the new strip-shaped sheet is fed,
- wherein, after the joining,
- the new strip-shaped sheet is fed to the press machine subsequent to the strip-shaped sheet by performing the feeding, and
- the new strip-shaped sheet is pressed subsequent to the strip-shaped sheet by performing the pressing,
- wherein the pressing punches out stator blanks used for stator stacking and rotor blanks used for rotor stacking, and
- wherein the joining applies the tape over the end of the strip-shaped sheet located in the direction opposite the direction in which the strip-shaped sheet is fed and the end of the new strip-shaped sheet located in the direction in which the new strip-shaped sheet is fed so as to avoid portions where the rotor blanks are punched out.

2. The method of progressive processing according to claim 1, wherein the tape employed in the joining comprises a non-magnetic adhesive tape.

3. The method of progressive processing according to claim 1, wherein the tape employed in the joining comprises a tape colored differently from the strip-shaped sheet and the new strip-shaped sheet.

4. The method of progressive processing according to claim 1 further comprising:
- forming a first cut surface inclined with respect to the direction in which the strip-shaped sheet is fed on the strip-shaped sheet by obliquely cutting, with respect to the direction in which the strip-shaped sheet is fed, the end of the strip-shaped sheet located in the direction opposite the direction in which the strip-shaped sheet is fed, and
- forming a second cut surface oriented along the first cut surface on the new strip-shaped sheet by cutting the end of the new strip-shaped sheet located in the direction in which the new strip-shaped sheet is fed in a direction oriented along the first cut surface,
- wherein the joining applies the tape over the ends of the two strip-shaped sheets so as to be oriented along the first cut surface and the second cut surface.

5. The method of progressive processing according to claim 1, wherein the joining applies the tape over one side of the strip-shaped sheet and one side of the new strip-shaped sheet on the same side as the strip-shaped sheet.

6. The method of progressive processing according to claim 1, further comprising uncurling the new strip-shaped sheet prior to pressing the new strip-shaped sheet, wherein the joining is performed after the uncurling of the new strip-shaped sheet.

* * * * *